United States Patent [19]

Dickie et al.

[11] Patent Number: 5,004,372
[45] Date of Patent: Apr. 2, 1991

[54] SPILL CONTAINMENT SYSTEM

[76] Inventors: Gerald M. Dickie, 2178 Lomina Ave.; Steve L. Liles, 1925 Pattiz Ave., both of Long Beach, Calif. 90815; Alan H. Woldvedt, 17274 Bellder Dr., Downey, Calif. 90242

[21] Appl. No.: 544,739

[22] Filed: Jun. 27, 1990

[51] Int. Cl.⁵ ............................................. B63B 43/16
[52] U.S. Cl. .................................... 405/63; 405/65; 405/66; 405/68; 114/229
[58] Field of Search .................. 114/74 R, 227, 229; 405/60, 63, 65, 66-69, 72; 210/242.3, 923

[56] References Cited

U.S. PATENT DOCUMENTS

| | | |
|---|---|---|
| 136,817 | 3/1873 | Cooper . |
| 312,613 | 2/1885 | Corey . |
| 351,971 | 11/1886 | Frisbie . |
| 353,718 | 12/1886 | Tuck ................... 114/229 |
| 373,133 | 11/1887 | Duncan ............... 114/229 |
| 381,302 | 4/1888 | Weihe . |
| 387,200 | 7/1888 | Schultz . |
| 564,144 | 7/1896 | Bricard . |
| 770,078 | 9/1904 | Kruger . |
| 1,107,680 | 8/1914 | Lucka . |
| 1,253,293 | 1/1918 | Sons . |
| 1,303,049 | 5/1919 | Endreson . |
| 1,307,040 | 6/1919 | Christensen . |
| 1,511,155 | 10/1924 | Blumberg . |
| 1,573,909 | 2/1926 | Blumberg . |
| 1,660,114 | 2/1928 | Blumberg . |
| 2,821,298 | 1/1958 | Richards ............... 206/47 |
| 3,183,876 | 5/1965 | Kronhaus ............. 114/229 |
| 4,026,233 | 5/1977 | Cox ....................... 114/229 |
| 4,161,155 | 7/1979 | Cloutier ............... 114/229 |
| 4,269,538 | 5/1981 | Hauan .................. 405/63 |
| 4,439,324 | 3/1984 | Crotti ................... 210/691 |
| 4,569,303 | 2/1986 | McDuff et al. ....... 114/227 |
| 4,712,502 | 12/1987 | McDuff et al. ....... 114/229 |

FOREIGN PATENT DOCUMENTS 4166 3/1888 United Kingdom ............... 114/229

Primary Examiner—Randolph A. Reese
Assistant Examiner—John A. Ricci
Attorney, Agent, or Firm—Fulwider, Patton, Lee & Utecht

[57] ABSTRACT

A system carried aboard tankers which upon deployment serves to positively contain oil leaking therefrom. A boot sealingly engages the hull while a buoyant boom supports the periphery of an impermeable liner attached to the boot. A skirt extending from the boom is tethered to the deck of the vessel. The entire system is normally maintained in a compact, folded form spooled up on a storage reel which is positioned on the deck of the tanker.

7 Claims, 3 Drawing Sheets

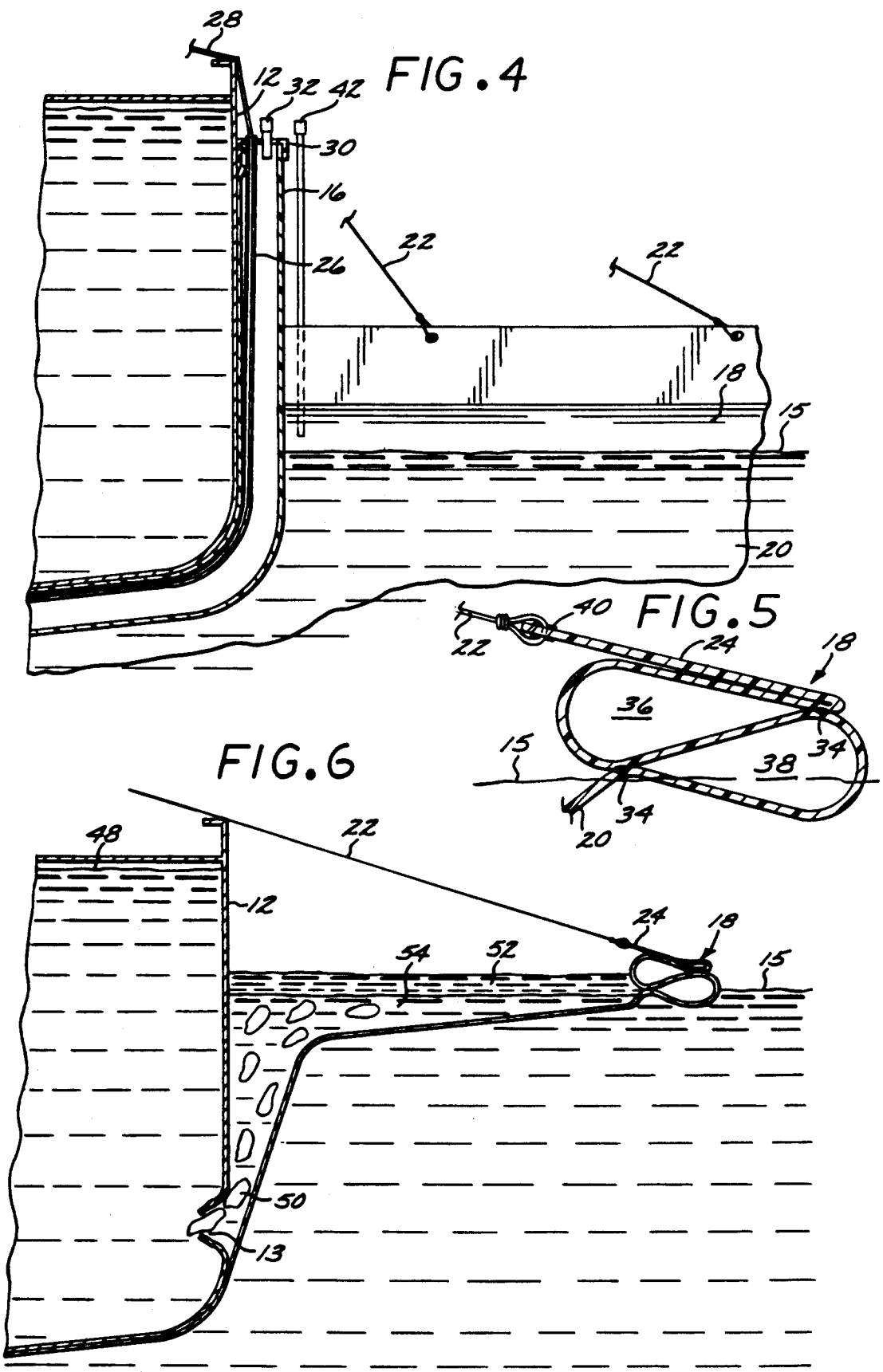

SPILL CONTAINMENT SYSTEM

BACKGROUND OF THE INVENTION

1. Field of the Invention

The present invention generally relates to spill containment systems, and more particularly, pertains to deployable devices for confining cargo leaking from watercraft, such as for example, oil escaping from a damaged tanker.

2. Description of the Prior Art

A certain amount of risk of spillage is always associated with the transport of cargo by ships across bodies of water. Spillage sometimes occurs during off-loading and on-loading operations or while a vessel is underway as a result of damage incurred in a collision or due to running aground. Such spillage can have catastrophic consequences when the spilled cargo is hazardous, especially when large quantities thereof stand to be lost. The environmental impact is devastating when a supertanker spills a load of crude oil near an ecologically sensitive coastline.

Various systems have been devised to prevent or minimize spillage, contain spillage, recover spillage, and/or treat spillage. None provide an effective and economically feasible means to reduce the environmental impact to an acceptable level. The magnitude of effort required to recover or treat an uncontained spill defies solution while the logistical impossibility of addressing all possible contingencies renders absolute prevention similarly unattainable. Efforts directed to containment or confinement would therefore appear to offer the most potential as an effective and feasible solution. However, no systems have been disclosed that are capable of positively containing a spill, are quickly and easily deployed and are readily implemented on an industry-wide basis in a relatively economical fashion.

The system currently most often relied upon requires the placement of floating booms around the perimeter of a spill. While this may be effective to prevent a film or a thin layer of oil from spreading, it is physically impossible for such a system to contain a significant volume of spillage. Although oil floats on water, it freely passes underneath such a boom once sufficient oil is present to float the boom. Additionally, rough water can easily cause oil to be pushed underneath or thrown over such a containment system. The fitment of a curtain-like structure extending a short distance below floating boom does enhance the efficacy of such a system but nonetheless fails to provide a positive containment system.

SUMMARY OF THE INVENTION

The present invention provides a system for containing cargo spilling from a ship. The system is especially well suited for containing oil leaking from a tanker. The device according to the present invention is stowable in relatively compact form, is quickly deployable and serves to positively contain fluid escaping from the ship until a clean-up operation can be undertaken. Moreover, the system is relatively inexpensive and therefore conceivably implementable on an industry-wide basis.

In deployed form a sealing boot tightly engages the ship's hull from a point above the waterline, across its bottom to a point above the waterline on the opposite side, a liner extends outwardly therefrom a substantial distance beyond the periphery of the ship, while the periphery of the liner is held afloat by a buoyant boom. A skirt affixed to the entire length of the boom is tethered to the deck of the ship.

The sealing boot consists of an inflatable tube structure having a line extending longitudinally therethrough. Inflation of the tube, once the line is tightly secured about the ship's hull, causes a seal to be achieved and effectively precludes the seepage of fluid between the boot and hull. The buoyant boom similarly consists of an inflatable tube structure and extends outwardly from the sealing boot along the entire periphery of the liner. Air hoses are provided to interconnect the inflatable tubes with an air source maintained on the ship. Prior to use, the entire device is maintained on a storage reel in a deflated and folded state preferably in position on the forward-most section of the deck. A second device, similarly stowed, may be maintained on the aftmost section of the deck. The devices are oriented on their respective storage reels such that the sealing boot is the first accessible component of the containment system.

In the event leakage is detected, the device stowed closest to the rupture or source of leakage is immediately deployed. The boot with attached boom, liner and skirt is pulled off the reel and dropped overboard while the ends of the line extending through the boot are carried, one on each side of the ship, to a point beyond the source of the leakage. The line is secured so as to take up all slack therein as it extends about the hull after which the boot is inflated. While the boot is being maneuvered into position, the remaining portions of the liner, boom and skirt are pulled off the reel and over the side of the ship. All tether lines attached to the skirt are secured on deck. Depending on sea and weather conditions, small support craft may have to be employed to assist in the deployment of the containment system. Upon inflation of the floatation boom, the device is capable of positively containing fluid spilling from the ship. The tether lines are individually paid out to accommodate increases in the volume of the spillage. The device is of sufficient size to contain a substantial portion of the cargo carried by the ship.

Other features and advantages of the present invention will become apparent from the following detailed description, taken in conjunction with the accompanying drawings, which illustrate by way of example, the principles of the invention.

BRIEF DESCRIPTION OF THE DRAWINGS

FIG. 4 is an enlarged cross-sectional view taken along lines 4—4 of FIG. 1;

FIG. 5 is an enlarged cross-sectional view taken along lines 5—5 of FIG. 1; and

FIG. 6 is an enlarged cross-sectional view of the system of the present invention in a deployed and partially filled condition.

DETAILED DESCRIPTION OF THE PREFERRED EMBODIMENT

The figures illustrate a preferred embodiment of the present invention adapted for use on an oil tanker. Two separate containment systems are maintained in a readily deployable condition, one near the bow of the ship and the other near the stern. When a leak is detected, the system nearest the source of the leakage is deployed to form an impermeable dammed area extending about the ship and capable of containing a substantial portion of the oil potentially lost from the ship until a clean-up operation can be undertaken.

Figure 1:
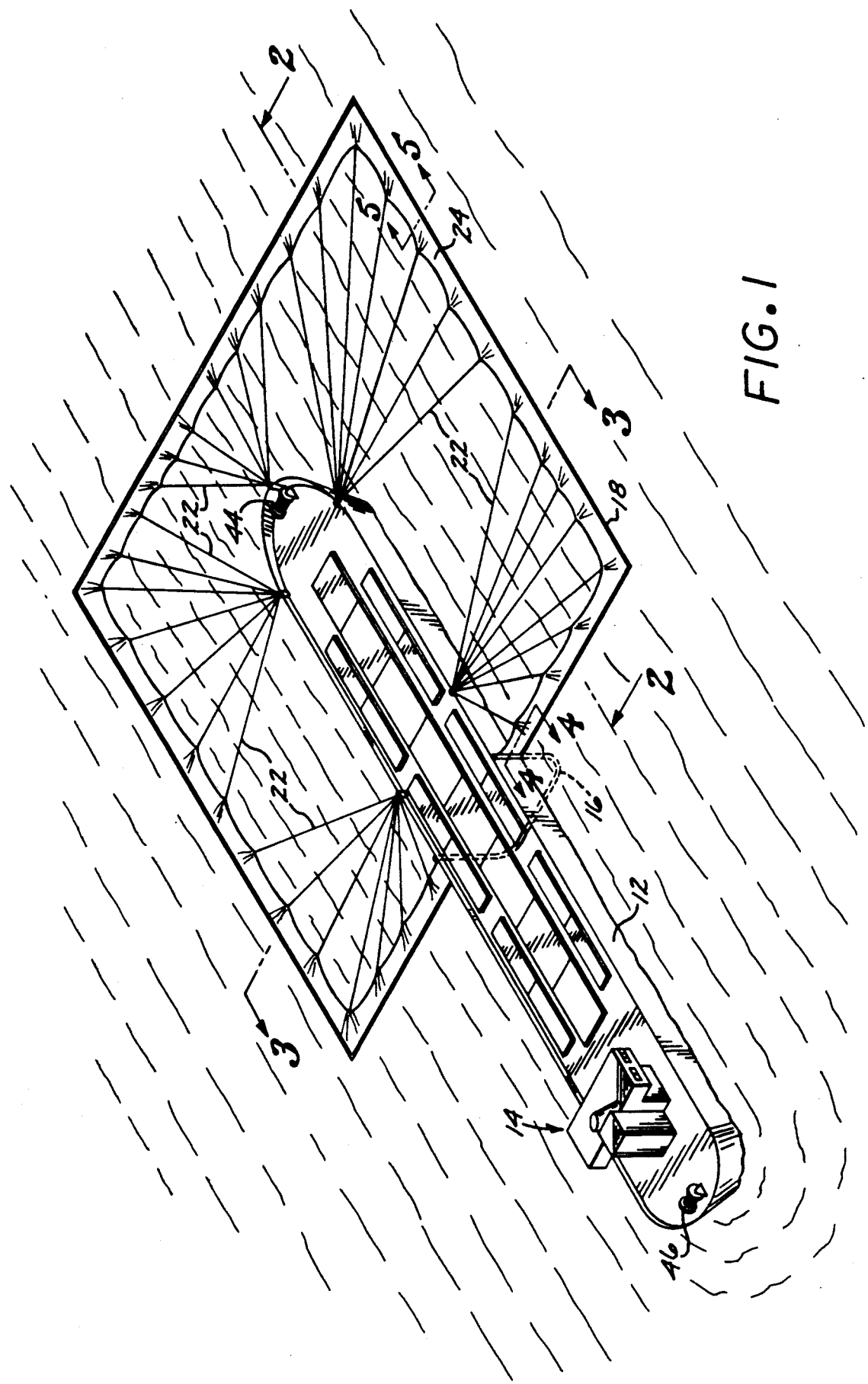
FIG. 1 is a perspective view of the device of the present invention in its fully deployed form.
Figure 2:
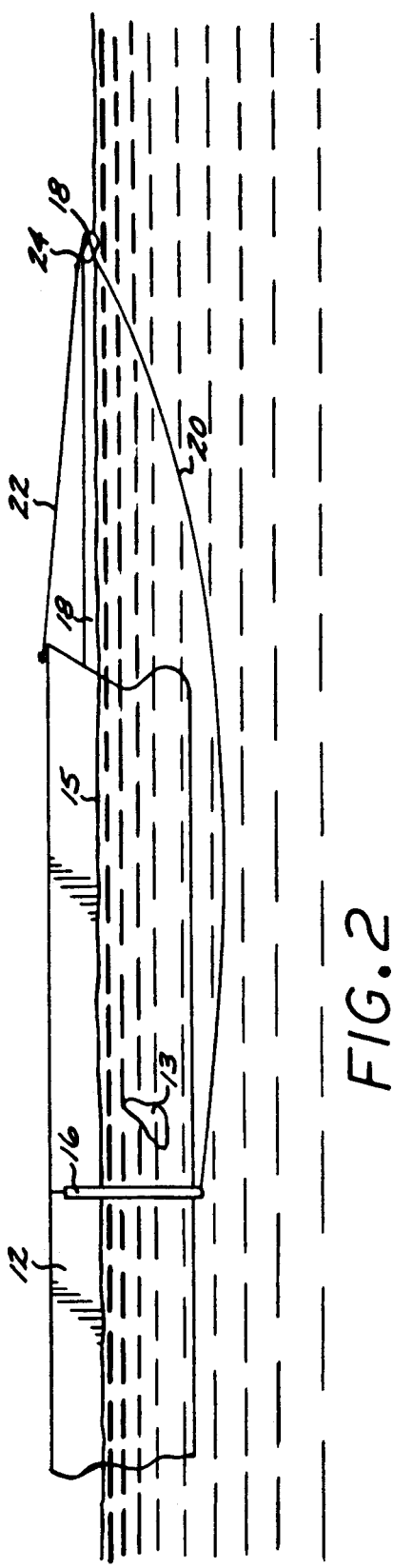
FIG. 2 is a cross-sectional view taken along lines 2—2 of FIG. 1.
Figure 3:
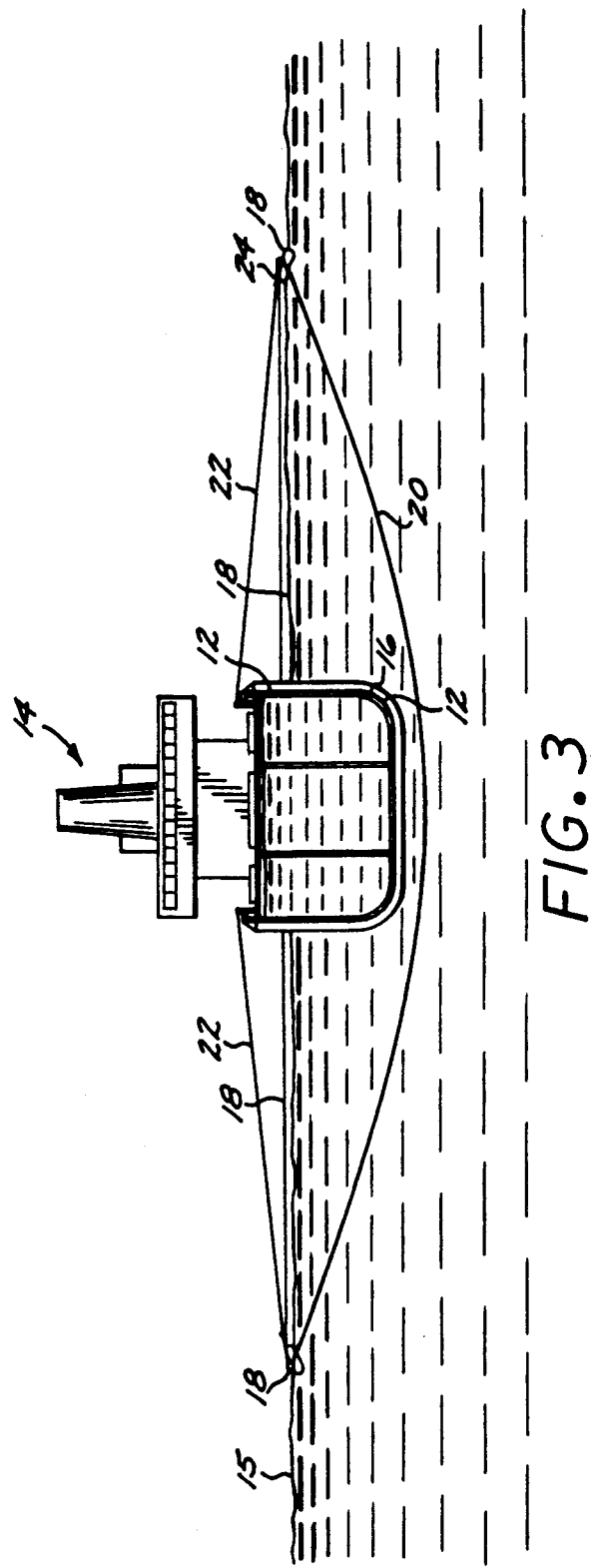
FIG. 3 is a cross-sectional view taken along lines 3—3 of FIG. 1.

FIGS. 1-3 illustrate the containment system of the present invention in its fully deployed state. In the pictured configuration the system is capable of containing oil leaking from a source 13 located in the forward portion of the ship's 14 hull 12. Sealing boot 16 sealingly engages hull 12 at a position just aft of the source 13 of leakage. Buoyant boom 18 is attached to sealing boot 16 at or above the waterline 15 and extends outwardly to define the outermost perimeter of the containment system. An impermeable liner 20 is contiguously affixed to sealing boot 16 as well as boom 18. Contiguously affixed to boom 18 is skirt 24, the periphery of which is tethered to the deck of the ship 14 via tether lines 22.

FIG. 4 provides an enlarged cross-sectional view of sealing boot 16 as it engages hull 12. The boot generally consists of an inflatable tubular structure of sufficient length to extend from above the waterline 15, on one side of ship 14 underneath hull 12 to above the waterline on the opposite side of the ship. Centrally located within boot 16 is sleeve 26 accommodating line 28 therein. End cap 30 enables the space within the tubular structure and outside sleeve 26 to be pressurized. Line 28 is of sufficient length to enable the position of boot 16 to be manipulated from deck and to allow the ends of the line 28 to be properly secured. Air hose 32 extends from within the tubular structure of boot 16 and is attachable to a source of pressurized air. FIG. 4 additionally shows buoyant boom 18 extending outwardly from boot 16 at or above waterline 15. Liner 20 is attached to both boom 18 as well as boot 16. Skirt 24 is similarly attached to boom 20 as well as a portion of boot 16.

FIG. 5 provides an enlarged cross-sectional view of boom 18. In the preferred embodiment of the liner 20, boom 18, and skirt 24 are formed from a single sheet of material. Folded and fused at 34 as shown, the structure provides two inflatable tubular cavities 36, 38 around the entire perimeter of the system. The edge of skirt 24 has eyelets 40 therein to facilitate attachment of the tether lines 22. Air hose 42 enables pressurized air to be conducted from a source (not shown) to the interior of cavities 36, 38.

The tanker 14 shown in FIG. 1 is outfitted with two separate and identical spill containment systems. Empty reel 44 had served to stow the system shown deployed. A second system is shown stowed on reel 46 in position near the ship's stern. Reels 44, 46 are of sufficient size to accommodate the entire boot 16, liner 20, boom 16 and skirt 24 assembly thereon in a folded and rolled up configuration, oriented such that boot 16 is the first accessible component.

The preferred material employed for the entire structure including boot 16, liner 20, boom 18 and skirt 24 is a PVC film. The material's tensile strength, its light weight and the capability of being fusion welded renders this material ideal for this application.

In use, upon detection of a leak, a determination must first be made as to whether the forward system or the aft system is nearest the source of the leakage. Once such a determination has been made, boot 16 is pulled off the nearest reel and dropped overboard while the ends of the line 28, one end on each side of the ship are carried into position beyond the source of the leakage. The line's ends are secured so as to take up all slack and firmly engage hull 12. Subsequently thereto the boot is inflated via air hose 32 causing the boot to sealingly engage the hull. While this is being accomplished, the rest of the liner 20 and boom 18 assembly is pulled off the reel and dropped overboard while the tether lines 22 are secured to the deck of the ship.

FIG. 6 illustrates a cross-section of the containment system shortly after deployment and before a significant amount of oil has escaped from the ship. All inflatable components are inflated, but since only a relatively small amount of oil has escaped, tether lines 22 hold boom 18 relatively close to the ship. A small quantity of water 54 is present within the containment system, said water having entered thereinto while boot 16 was being maneuvered into position and before said boot was inflated to sealingly engage the hull. Oil 50, escaping from the rupture 13, freely floats to the top 52 of the water level within the contained area and spreads out to the perimeter defined by boot 18. As more and more oil fills the dammed area, tether lines 22 are paid out to relieve the tension. The entire structure is of sufficient size such that the loads the tether lines 22, skirt 24, boom 18 and liner 20 are subjected to are well below the load limits of the individual components even when the system is serving to contain a substantial portion of the tanker's cargo of oil. A clean-up operation can be undertaken at any time, wherein the oil contained within the dammed area is pumped to any empty tanker. Alternatively, the spilled oil may be pumped to the leaking tanker's own ballast holds.

While a particular form of the invention has been illustrated and described, it will also be apparent to those skilled in the art that various modifications can be made without departing from the spirit and scope of the invention. Accordingly, it is not intended that the invention be limited except as by the appended claims.

What is claimed is:

1. A deployable device for containing cargo leaking from a watercraft, comprising:
 a sealing boot transversely positionable about the watercraft's hull and of sufficient length to extend from a point above the waterline on one side of the hull, underneath the hull to a point above the waterline on the opposite side of the hull, for sealingly engaging said hull upon deployment;
 an impermeable liner, contiguously affixed to said sealing boot and dimensioned so as to be extendable substantially beyond the periphery of said watercraft; and
 a buoyant boom, contiguously affixed to the periphery of said liner.

2. The device of claim 1, further comprising:
 a skirt, contiguously affixed to and extending from said boom; and
 means for tethering the periphery of the skirt to the watercraft.

3. The device of claim 1 wherein said sealing boot comprises a tubular inflatable structure centrally accommodating a line extending therethrough whereby the line is securable to the watercraft and subsequent inflation of the tubular structure causes said boot to sealingly engage said hull.

4. The device of claim 1 wherein the periphery of said liner is folded over and fused to the liner to form an inflatable cavity to define said boom.

5. The device of claim 4 wherein said liner comprises PVC film.

6. The system of claim 1 further comprising means for stowing said device on the deck of said watercraft so as to be readily deployable.

7. The system of claim 6 wherein said stowing means comprises a reel.

* * * * *